United States Patent Office 3,516,868
Patented June 23, 1970

---

3,516,868
ELECTRIC BATTERIES WITH THERMAL ACTIVATION
Claude Nee, Antony, Claude Pathe, Clamart, and Claude Charnay, Chilly-Mazapin, France, assignors to Nord-Aviation Societe Nationale de Constructions Aeronautiques, Paris, France, a joint-stock company of France
Filed Oct. 2, 1967, Ser. No. 672,123
Claims priority, application France, Oct. 11, 1966, 79,561
Int. Cl. H01m *17/06;* C06c *1/00*
U.S. Cl. 136—90
13 Claims

ABSTRACT OF THE DISCLOSURE

Method of thermal activation of electric batteries having a fusible electrolyte, comprising bringing up the cell to a temperature equal to or higher than the melting temperature of the electrolyte, by means of a pyrotechnic mixture enclosed in the cell between the anode and the cathode. The pyrotechnic mixture contains zirconium and barium chromate and the residues, after reaction, participate in the electro-chemical process. The activation time is of the order of 0.2 second.

---

Figure 1:
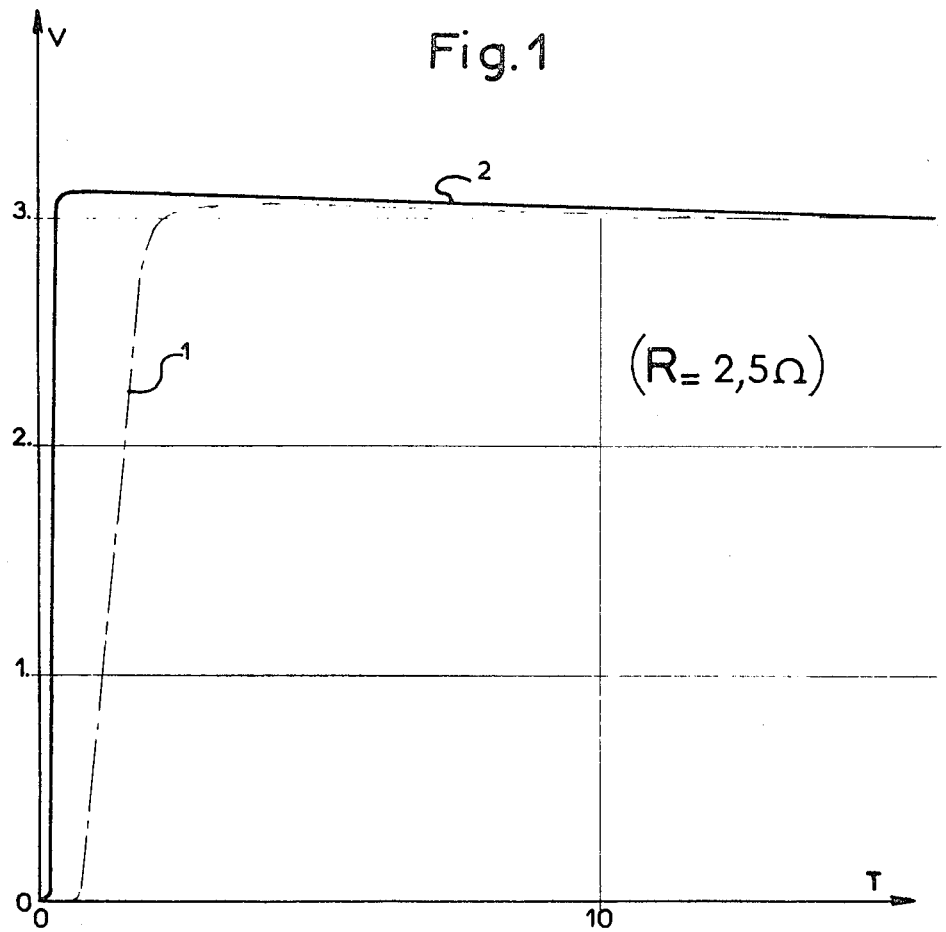

The present invention relates to a method of thermal activation of electric batteries having a fusible electrolyte, together with a device for carrying the above method into effect. The invention further relates to electric batteries provided with the said device.

There are known at the present time batteries with thermal activation which are constituted by unitary cells comprising a metallic casing closed by a cover, this assembly playing the part of a cathode.

The anode is located at the centre of this casing. It is insulated from this casing by insulating sheets impregnated with electrolyte (glass fabric for example). The depolarizing agent is compressed into a grid of the same nature as the casing, and welded to this latter, which in fact forms a double cell, the various elements being arranged symmetrically on each side of the anode.

These cells only function when they are brought up to a temperature equal to or higher than the melting temperature of the electrolyte.

This thermal activation is obtained by means of a pyrotechnic mixture which encloses each cell for example: alternate stacking of cylindrical cells and washers of pyrotechnic mixture.

The firing of the mixture is effected by means of an electrical or mechanical percussion control.

The activation period, that is to say the period of time separating the instant of the electrical or mechanical firing order and that at which the maximum power of the battery is obtained, is of the order of one second for batteries with double cells described above since, in order that such an element may supply electrical energy, it is essential that the temperature of the electrolyte should pass from the ambient temperature (frequently of the order of 20° C.) to a temperature higher than the melting temperature throughout its whole mass.

Before melting the electrolyte, the heat flux must pass through the thermal barrier constituted by the metal cathode wall and the cathode grid coated with a layer of depolarizing agent.

Now, in certain applications, and in particular in armaments, it is often necessary to have as short an activation time as possible, in any event very much less than one second, and this must be obtained irrespective of the ambient climatic conditions of the battery.

The present invention makes it possible to satisfy these essential conditions by permitting an activation time very much less than one second to be obtained, without affecting either the output or the capacity of the battery.

The method according to the invention—intended for the activation of an electric battery having a unitary cell of the type comprising a metal casing playing the part of the cathode, a depolarizing agent in contact with the said cathode, a fusible electrolyte and a metal anode—is essentially characterized by the fact that the electrolyte is brought up to its melting temperature by creating inside the cell, between the anode and the cathode an exothermic reaction between a metal and an oxidizing agent, the residues of which after reaction participate in the electrochemical process.

For carrying into effect the above method, the device according to the invention is essentially characterized by the fact that it is constituted by a plate of pyrotechnic composition of the metal-oxidizing agent type, inserted between the anode and the cathode in the heart of the stack constituting the cell. According to a first alternative form of embodiment, the pyrotechnic composition may also include an electrolyte, either as a mixture or as an insertion in orifices or channels formed in the plate of the said composition, or in a thin superficial layer.

According to a second alternative form, the pyrotechnic composition may also include an electrolyte and a depolarizing agent.

Figure 2:
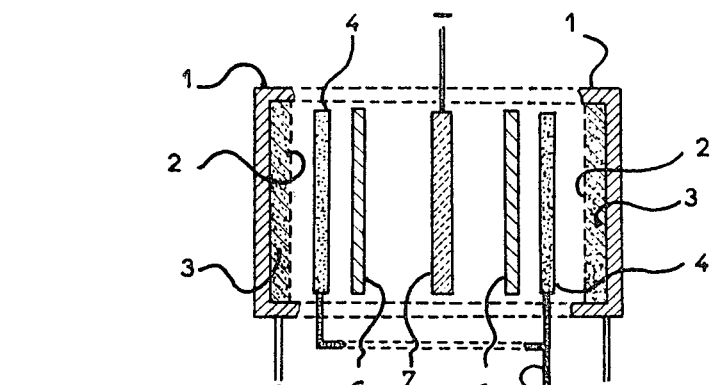

Other characteristic features and advantages resulting from the present invention will be brought out more clearly in the description which follows below, reference being made to the accompanying drawings, in which:

FIG. 1 represents a graph indicating the variation of the voltage as a function of time for battery activated by the usual means and according to the invention respectively;

FIG. 2 gives a diagrammatic view in exploded longitudinal cross-section of one preferred form of construction of a battery provided with the activation device according to the invention.

The method in accordance with the invention makes it possible to obtain a very short activation time with an excitable cell having a fusible electrolyte, since the heat flux does not have to pass through the thermal barrier constituted by the metallic cathode wall coated with a layer of depolarizer, and since the heat produced by the exothermic reaction is liberated directly inside the electrolyte and the elements of the cell.

This activation time is thus of the order of 0.2 to 0.3 second, as indicated by the graph of FIG. 1, in which there is plotted in abscissae the time in seconds and in ordinates the tension in volts at the terminals of the battery on load with a resistance of $R=2.5$ ohms, and in which the curves 1 and 2 indicate respectively the variations of the voltage on load of a battery activated by the usual means and of a battery according to the invention under load at the terminals of the same resistance such as above, and in which the anode, the depolarizing agent, the electrolyte and the cathode are identical.

A pyrotechnic composition of the metal-oxidizing agent type intended to produce the exothermic reaction may be constituted for example by a mixture of zirconium (38%) and barium chromate (57%) in powder, which may in turn be mixed with neutral fibres (5%), for example of glass or asbestos, intended to permit the forming and shaping of plates of the composition. After reaction, the residues remain in the grid form impregnated with electrolyte.

To this composition, there may be added an electrolyte for example 35 parts by weight per 100 parts of pyrotechnic composition.

A depolarizing agent may also be added to this latter composition, for example 5 parts per 100 parts of the said composition.

These additions may be effected either by mixture in course of preparation, or by filling up orifices passing through the plate, or by coating the plate with a thin layer of electrolyte. The firing device can be constituted in known manner, for example by a "fuse" of pyrotechnic composition, passing out of the casing of the cell.

The added electrolyte may be of the same nature as that of the battery. According to an advantageous alternative form, it may be constituted by an electrolyte having a melting point higher than that of the battery electrolyte, which ensures a higher rate of temperature rise of the cell. By way of example, $CaCl_2$ can be employed.

The battery according to the invention is composed of one or more cells constituted by the following assembly:

A metal cathode plate 1 (FIG. 2) on which is welded a cathode grid 2 of the same metal;
A layer of depolarizer-electrolyte mixture 3, finely ground and pressed on the grid 2;
A plate 4 of pyrotechnic composition, provided with its firing device 5;
A porous insulating fabric 6 impregnated with electrolyte:
A metal plate 7 constituting the anode, on each side of which the above elements are arranged symmetrically.

Each cell of this type is independent and it is possible to constitute a battery having the chosen output and voltage, by simply assembling cells together in series-parallel groups.

According to one preferred form of construction of the battery according to the invention, the cathode assembly 1 and 2 is of nickel or of metal coated with an electrolytic deposit of gold, the depolarizing agent 3 is ferric sulphate, the electrolyte 6 is a eutectic mixture of LiCl and KCl, and the anode 7 is of calcium.

The batteries according to the invention have a speed of activation of the order of 0.2 to 0.3 second and a useful duration of operation of the order of 20 seconds. However, the speed of activation may be increased by grouping together "double" batteries such as described above and "single" cells, the elements of which are thinner and increase in temperature more rapidly. These latter cells have a duration of operation very much less than those preceding, but their duration is sufficient to permit them to deliver during the activation time of the first, which deliver current in their turn for the required duration period. The grouping together of these two properties (rapid activation and sufficient duration of operation) in a single cell assembly gives a gain in overall size, weight and price which is very considerable as compared with the solutions known up to the present time.

It will of course be understood that the present invention has only been described by way of explanation and not in any limitative sense, and that any useful modifications may be made thereto without thereby departing from its scope.

We claim:

1. An electric battery with thermal activation comprising
   a metallic casing forming the cathode of the battery,
   a metal plate anode within said casing,
   a cathode grid attached to said casing and made of material similar to said casing,
   a depolarizer and electrolyte mixture of material on said grid,
   a pyrotechnic composition within said casing between said cathode and said anode and having a firing fuse connected thereto,
   a porous support containing a fusible electrolyte between said cathode and said anode and adjacent said pyrotechnic composition.

2. The battery of claim 1, further characterized by said pyrotechnic composition being in the form of a plate
   said porous support containing said electrolyte located between said pyrotechnic composition plate and said anode.

3. The battery of claim 1, further characterized by said pyrotechnic composition constituted by 38% zirconium, 57% barium chromate, and 5% neutral fibers.

4. A device for the thermal activation of an electric battery constituted by an insulated anode plate of calcium and, placed symmetrically with respect to said anode, a plate comprising a fusible electrolyte constituted by the eutectic LiCl/KCl, a plate of a pyrotechnic composition constituted by 38% zirconium, 57% barium chromate and 5% neutral fibers, and a cathode constituting the casing of the battery and formed of nickel and internally coated with gold and having a plate of depolarizing agent constituted by ferric sulphate in contact with said cathode, said plates of pyrotechnic composition each being connected to a firing fuse of pyrotechnic composition passing out said casing of the battery.

5. A device for the thermal activation of an electric battery constituted by an insulated anode plate of calcium and, placed symmetrically with respect to said anode, a plate comprising a fusible electrolyte constituted by the eutectic LiCl/KCl, a plate of a pyrotechnic composition constituted by 38% zirconium, 57% barium chromate and 5% neutral fibers, and a cathode constituting the casing of the battery and formed of nickel and internally coated with gold and having a plate of depolarizing agent constituted by ferric sulphate in contact with said cathode, said plates of pyrotechnic composition each being connected to a firing fuse of pyrotechnic composition passing out said casing of the battery and in which the plate of pyrotechnic composition further comprises an additive constituted by 35 parts by weight of electrolyte for 100 parts of pyrotechnic composition.

6. A device according to claim 5, in which the plate including the pyrotechnic composition further includes electrolyte and 5 parts by weight of depolarizing agent to 100 parts of the total composition.

7. A device according to claim 5, in which said additive included in the plate of pyrotechnic composition is in the form of a mixture with said composition.

8. A device according to claim 5, in which said additive is located in orifices passing through said plate of pyrotechnic composition.

9. A device according to claim 5, in which said additive is in the form of a thin layer coated on said plate of pyrotechnic composition.

10. A method of thermal activation of an electric battery constituted by an anode plate and, placed symmetrically with respect to said anode plate, two cathode plates, provided with a depolarizing agent, plates of a pyrotechnic composition and plates comprising a fusible electrolyte adjacently placed between said anode and said cathode plates, in which the electrolyte is brought up to its melting temperature by initiating, inside said battery, between the anode and the cathode, an exothermic reaction of a pyrotechnic composition.

11. A method of thermal activation of an electric battery constituted by an anode plate and, placed symmetrically with respect to said anode plate, two cathode plates, provided with a depolarizing agent, plates of a pyrotechnic composition and plates comprising a fusible electrolyte adjacently placed between said anode and said cathode plates, in which the electrolyte is brought up to its melting temperature by initiating, inside said battery, between the anode and the cathode, an exothermic reaction of a pyrotechnic composition constituted, by weight, by 38% zirconium, 57% barium chromate and 5% of neutral fibers selected in the group consisting in asbestos and glass.

12. A method according to claim 11, in which the pyrotechnic composition further includes an electrolyte of the same nature as that of the fusible electrolyte and having a melting point higher than that of said fusible electrolyte, in a proportion of 35 parts by weight to 100 parts of pyrotechnic composition.

13. A method according to claim 11, in which the pyrotechnic composition includes an electrolyte of the same nature as that of the fusible electrolyte and having a melting point higher than that of said fusible electrolyte in a proportion of 35 parts by weight to 100 parts of pyrotechnic composition and further includes a depolarizer in a proportion of 5 parts by weight of total composition.

References Cited

UNITED STATES PATENTS

| | | | |
|---|---|---|---|
| 2,953,443 | 9/1960 | Lloyd | 149—37 |
| 3,055,960 | 9/1962 | Yalom et al. | 136—90 |
| 3,079,454 | 2/1963 | McGinnis | 136—83 |
| 3,118,798 | 1/1964 | Winckler | 149—37 |
| 3,132,971 | 5/1964 | Selis et al. | 136—153 |
| 3,345,214 | 10/1967 | Zauner et al. | 136—90 |

OTHER REFERENCES

J. of Electrochem. Society, vol. 99, No. 8, August 1952, pp. 207c, 208c, by Goodrich et al.

CARL D. QUARFORTH, Primary Examiner

H. E. BEHREND, Assistant Examiner

U.S. Cl. X.R.

136—83; 149—37